United States Patent
Busboom et al.

(10) Patent No.: US 7,958,548 B2
(45) Date of Patent: Jun. 7, 2011

(54) METHOD FOR PROVISION OF ACCESS

(75) Inventors: Axel Busboom, Unterleinleiter (DE); Marko Schuba, Aldenhoven (DE); Raphael Quinet, Liège (BE); Silke Holtmanns, Klaukkala (FI)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 805 days.

(21) Appl. No.: 10/551,855

(22) PCT Filed: Apr. 4, 2003

(86) PCT No.: PCT/EP03/03539
§ 371 (c)(1),
(2), (4) Date: Jul. 26, 2006

(87) PCT Pub. No.: WO2004/088947
PCT Pub. Date: Oct. 14, 2004

(65) Prior Publication Data
US 2007/0067836 A1 Mar. 22, 2007

(51) Int. Cl.
*G06F 7/04* (2006.01)
*H04L 9/00* (2006.01)
*H04L 9/32* (2006.01)

(52) U.S. Cl. ......... 726/10; 726/3; 726/4; 726/5; 726/6; 726/7; 713/168; 713/169; 713/170; 713/171; 713/172

(58) Field of Classification Search ............ 726/10
See application file for complete search history.

(56) References Cited

U.S. PATENT DOCUMENTS
6,023,510 A * 2/2000 Epstein ............ 705/74
2002/0049580 A1 * 4/2002 Kutaragi et al. ......... 704/1

FOREIGN PATENT DOCUMENTS
WO WO 02 076078 A 9/2002

OTHER PUBLICATIONS
Patel B et al: "Ticket Based Service Access for the Mobile User" Mobicom. Proceedings of the Annual International Conference on Mobile Computing and Networking, XX, XX 1997, pp. 423-433, XP000900778 p. 226, left-hand column, line 17—p. 228, left-hand column, line 10.

* cited by examiner

*Primary Examiner* — Longbit Chai

(57) ABSTRACT

A method for provision of access for a data requesting entity (IRE) to data related to a principal is disclosed, comprising the steps of (i) creating an access granting ticket comprising an access specification specifying a permission for an access to data related to the principal, said data being available at a data providing entity (IPE1), and a principal identifier representing the principal towards the data providing entity (IPE1), (ii) encrypting the access granting ticket with an encryption key of the data providing entity (IPE1), (iii) communicating to the data requesting entity (IRE) the encrypted access granting ticket accompanied by an identifier of the data providing entity (IPE1), (iv) communicating from the data requesting entity (IRE) to the data providing entity (IPE1) a request comprising the encrypted access granting ticket, (v) decrypting the encrypted access granting ticket with a decryption key of the data providing entity (IPE1) corresponding to the encryption key, (vi) providing to the data requesting entity (IRE) access to data related to the principal identifier according to the access specification.

30 Claims, 3 Drawing Sheets

METHOD FOR PROVISION OF ACCESS

TECHNICAL FIELD OF THE INVENTION

The present invention relates to communication systems and especially to a method for provision of access for a data requesting entity to data related to a principal. The invention also concerns devices and computer programs.

BACKGROUND OF THE INVENTION

In communication systems, user related data can be stored at many different entities like a mobile phone, a server of a service provider, and a node of a mobile operator.

Examples for user related data are (i) personal information like a name, an identifier, or the date of birth of the user, (ii) financial information like a bank account number, credit card number, a credit history, or a bank account balance, (iii) preference information like a list of goods recently ordered or web sites recently visited, browser and mobile phone settings, and (iv) personal context information like location or availability information of the user.

User related data can be regarded as data that is related to an identity of a user in a communication system. In that sense, the concept of a user and user related data can be expanded to other entities having an identity in a communication system, e.g. a device having a device identity like a identification code and device related data stored somewhere. The device related data can be stored together with the identity of the device at an entity of a communication system, e.g. a secret access code being stored with an identification code.

For describing an entity having an identity in a communication system, the terminology principal is used. A principal is a set of one or more linked identities of an entity in a communication system. A principal can e.g. represent a person, sometimes also called user, or a device as explained before. A user can be represented by one or more principals and a principal can be shared by one or more users. Thus, data related to a principal or principal data can be regarded as information that is related to an identity of said principal. A principal identifier can indicate the identity of a principal at an entity.

Principal related data can be collected and processed by many data storages, which can be operated by different entities. Thus, principal related data can be distributed, i.e. spread, over many entities and access, exchange, and storage of principal data can occur without knowledge or control of the principal, which is a drawback from a data security point of view.

According to H. Zandbelt, B. Hulsebosch, H. Eertink, "IDsec: Virtual Identity on the Internet", Internet Engineering Task Force, Internet Draft draft-zandbelt-idsec-01.txt, May 2002, a profile manager can be used to provide to a profile requester access to attributes of a profile, i.e. a data record that contains information about a certain profile owner, stored by the profile manager.

For providing access, the profile requester presents a session certificate provided by the profile owner together with a requester certificate owned by the profile requester to a profile retrieve service of the profile manager. The requester certificate indicates the requested attributes of the profile of the profile owner.

The session certificate is provided to the profile owner when logging with profile manager specific credentials into a session login service of the profile manager. The session certificate consists of a profile manager location, i.e. a reference to the profile retrieve service, a session identifier uniquely identifying the session where the profile owner is logged in, and a profile manager signature used for a verification of the integrity of the data in the session certificate by the profile manager when the session certificate is presented to by the profile requester for profile retrieval. Furthermore, the session certificate contains a public key generated by the profile owner for passing information from the profile requester to the profile owner in a secure manner and it contains an expiration date preventing the reuse of the certificate after the specified date.

When the profile manager receives the request from the profile requester, the profile retrieve service verifies the session certificate and uses the session identifier to find the profile owner associated with the session. Furthermore, the profile manager verifies, the profile requester certificate by means of trusted certificates stored by the profile owner.

The profile manager has stored an access control list for each attribute of the profile of the profile owner specifying which profile requesters have read-access per attribute. Based on the requester verification and the access control list, a requester specific profile is assembled by interpreting the access control list for each attribute of the requester certificate. In a response, the attributes of the requester specific profile encoded in XML format are sent to the requester.

The solution according to Zandbelt et al. requires a profile manager that is accessed in a session by both the profile owner and the requester for provision of the principal related data to the requester. However, the solution according to Zandbelt et al. does not consider the fact that principal data are already distributed over many entities which are typically not accessible by the principal. Therefore, a principal data containing entity being not accessible by the principal is thus excluded from the provision of principal data to a requester. Furthermore, the solution according to Zandbelt et al. is restricted to a session, i.e. out-of-session retrieval of attributes of the profile is not possible. In addition, as only one profile manager can be used per session, profile owner related data distributed over several profile managers cannot be provided to the requester in a session. However, storing of all principal data at a single entity is questionable from a security point of view. In addition, the storage of all or a major amount of principal data at a single entity increases the storage capacity needed for storing the principal data. Furthermore, many principal data like the location of a principal need to be updated. However, transferring of data that needs to be updated to a profile manager requires signaling and processing effort both at the entity carrying the profile manager and the entity where the updated data is generated. Furthermore, using an access control list stored at the profile manager can be inflexible and complex.

SUMMARY OF THE INVENTION

It is an object of the present invention to provide a method, devices and computer programs, which overcome the aforementioned problems and provide improved access for a data requesting entity to data related to a principal.

This object is achieved by the method as described in claim 1. Furthermore, the invention is embodied in a principal entity as described in claim 12, a data requesting entity as described in claim 19, a data providing entity as described in claim 22, a computer program loadable into a processing unit of a principal entity as described in claim 28, a computer program loadable into a processing unit of a data requesting entity as described in claim 29, and a computer program loadable into a processing unit of a data providing entity as described in claim 30. Advantageous embodiments are described in the further claims.

The present invention discloses a method for provision of access for a data requesting entity to data related to a principal. The method comprises the following steps.

First, an access granting ticket is created. The access granting ticket can be e.g. created in advance or in response to a request coming from the data requesting entity. The access granting ticket comprises an access specification and a principal identifier. The access specification specifies a permission for an access to data related to the principal. Said data is available at a data providing entity. Available does not necessarily mean that the data related to the principal is present at the data providing entity, e.g. the available data can be transferred from another entity to the data providing entity. The principal identifier represents the principal towards the data providing entity.

An example for an access specification is a list specifying which data related to the principal identifier at the data providing entity are allowed to be accessed and which not. The permission for access can be e.g. at least one permission from a group comprising read, write, modify, append, create, and delete etc. permission wherein the permission can be e.g. positive, i.e. access is allowed, or negative, i.e. access is not allowed. Examples for a principal identifier are the real name of the principal being e.g. a user, a pseudonym at which the principal is known at the data providing entity, a digital signature of the principal, or a secret shared between the principal and the data providing entity or combinations thereof.

The access granting ticket is encrypted with an encryption key of the data providing entity. The encryption with a public key or a secret key prevents that any further entity not being in possession of the corresponding decryption key can get access to the contents of the access granting ticket thus ensuring confidentiality, integrity, and privacy of the encrypted data.

In a next step, the encrypted access granting ticket is communicated to the data requesting entity. The encrypted access granting ticket is accompanied by an identifier like an address or a name of the data providing entity.

The creating, encrypting, and/or communicating step can be executed e.g. by a principal entity. One or more of the creating, encrypting, and communicating step may be executed on behalf of the principal at one or more further entities offering a service for creating, encrypting and/or communicating. The creating, encrypting, and/or communicating or parts thereof may be triggered by a request for data related to the principal. Alternatively, an encrypted access granting ticket may be communicated to the data requesting entity without an explicit request for principal data.

Based on the identifier of the data providing entity, the data requesting entity communicates a request to the data providing entity. The request comprises the encrypted access granting ticket.

The encrypted access granting ticket is decrypted with a decryption key of the data providing entity corresponding to the encryption key. The decryption may be executed e.g. by the data providing entity or may be executed on behalf of the data providing entity at a further entity offering a decryption service.

Access is provided to the data requesting entity to data related to the principal identifier according to the access specification.

The method provides improved access for a data requesting entity to data related to a principal. The method makes usage of an access granting ticket sent to the data requesting entity.

The data requesting entity communicates the access granting ticket to the data providing entity. Therefore, there is no need that a principal has access to the data providing entity for providing to a data requesting entity access to the data related to the principal. In addition, the usage of an access specification in the access granting ticket overcomes the requirement to store an access control list in the data providing entity which can be advantageous, because for specifying an access specification, access of the data providing entity is not required according to the present invention, thus increasing the number of possible data providing entities. Furthermore, the access specification for a requesting entity can be less complex than an access control list for all possible data requesting entities. In addition, if a new requesting entity is to be provided with access to data related to a principal, a new entry at the access control list at the profile manager has to be made for the new requesting entity which is not necessary according to the present invention. Instead, an already existing access specification for a first data requesting entity may be re-used in unmodified or modified form in the access granting ticket. Similar applies to updating of access specifications. In addition, the method according to the current invention is not restricted to a single profile manager in a single session and access to data related to the principal can be provided from any kind of data providing entity that can be accessed by the data requesting entity and that can provide the access to the data according to the decrypted access granting ticket. As access granting tickets can be directed to any kind of data providing entity, a centralization of data related to a principal can be avoided, thus reducing processing and signaling effort and supporting the provision of access to data which is frequently updated. Furthermore, as the data requesting entity is typically not in possession of the private or secrete decryption key of the data providing entity, confidentiality, integrity, and privacy of the encrypted data the data requesting entity is ensured.

According to a preferred embodiment, the encrypted access granting ticket comprises or is accompanied by verification information and access is provided based on an analysis of the verification information. The verification information can be information that e.g. proof to the data providing entity that the data requesting entity is entitled for data access. Examples for verification information for verifying the data requesting entity are an identifier like a name or a pseudonym or an identifier of the data requesting entity in the encrypted access granting ticket based on that the data providing entity can verify if the entity submitting the encrypted access granting ticket complies to the identifier in the encrypted access granting ticket. Another example for verification information for the data requesting entity is a digital signature of the data requesting entity. Verification information for verifying the principal like a shared secret or pseudonym or an identifier or a digital signature of the principal is another example for verification information. The verification information may be hashed and the verification information may be attached, e.g. in clear text, to the encrypted access granting ticket comprising the hash value for verification. Based on the outcome of the verification, the provision of access can be e.g. granted or denied or restricted.

According to another preferred embodiment, the request to the data providing entity comprises a specification for requested data related to the principal and access is provided according to a matching of the access specification and the requested data. This procedure increases the flexibility the method, because the data requesting entity can be provided with a ticket without explicitly knowing what access permissions are specified in the access specification and might ask for the requested data being identical or different to the data specified by the access specification. An analysis of the requested data and the data specified in the access specification for a matching enhances the security of the method, because the data providing entity may make its decision for the provision of access depending on the matching, e.g. for the requested data being identical to the data specified in the access specification, the access is provided. In case of a mismatch, the data providing entity may e.g. deny the access at all or deny the access for the part of the requested data and the part of the data according to the access granting ticket that do not match. Further actions resulting from an analysis of the matching are possible. Thus, the analysis for matching can ensure that access is not provided to data being allowed to be accessed according to the access granting ticket but being not requested.

According to another preferred embodiment, the access granting ticket can be created based on a data storage correlating at least two items of a group comprising the identifier of the data providing entity, the data related to the principal available at the data providing entity, the principal identifier, the encryption key, and the access specification. Using the data storage is preferable because it makes the creation of the access granting ticket easier, because otherwise, e.g. the principal has to remember all or some of the parts or their correlations necessary for encrypted access granting ticket creation. The data storage can e.g. exist at a principal entity. The usage of correlated access specifications can be advantageous if predetermined access specifications are used that might be included into the access granting ticket in unmodified or modified form.

According to another preferred embodiment, an indication for the access specification is entered by the principal into a principal entity to create the access granting ticket. An access specification may be explicitly specified by the principal by entering the wanted permission for certain data into the principal device. This procedure may be advantageous if only very few data related to the principal are allowed to be accessed and/or for non-complex access specifications, e.g. read-permission for the current location of the principal. An indication for an access specification can be a selection with or without modification of a predetermined access specification, e.g. from a group of predetermined access specifications. An indication can be a confirmation of a predetermined access specification.

According to another preferred embodiment, the access granting ticket further comprises security information and access is provided based on an analysis of the security information. Including security information into the access granting ticket and analyzing the included security information for provision of access enhances the security of the method. Examples for security information are a time-to-live indicator indicating a validity period of the access granting ticket or a sequence number. Further security data like random data, sometimes called nonce, may be included for reducing the risk of cryptoanalysis by an attacker.

The presence of the nonce may be analyzed for access provision or may be not considered.

According to another preferred embodiment, the encrypted access granting ticket is accompanied by public information. Examples for public information are e.g. partial or whole contents of the encrypted access granting ticket like the access specification or parts thereof, security information like a time-to-live indicator, or verification information like a name of the data requesting entity or combinations thereof. The public information can be analyzed by any of the involved parties and decisions for further procedures can be made based on the analysis of the public information, e.g. resulting in an early rejection of the encrypted access granting ticket if the analysis of the public information reveals that the encrypted access granting ticket is e.g. invalid, which can save processing power and time or communication effort.

According to another preferred embodiment, the request to the data providing entity can be communicated based on an analysis of the public information, e.g. when a time-to-live indicator in the public information reveals that the ticket is no longer valid, the request to the data providing entity may be skipped.

According to another preferred embodiment, the execution of the decryption of the encrypted access granting ticket is based on an analysis of the public information. Similarly, if an analysis of the public information reveals that the access granting ticket is not valid e.g. because a validity period has been expired or the data requesting entity is not entitled to request for data or the access according to the access specification do not match to the requested data requested by the data requesting entity, the decryption may not be executed. This is advantageous as decryption consumes processing power, which can be saved in the case that invalid encrypted access granting tickets are sorted out by an analysis of public information.

According to another preferred embodiment, the data to which access is provided to can be transferred to the data requesting entity.

According to another preferred embodiment, at least one further encrypted access granting ticket for further data related to the principal available at at least one further data providing entity is created and communicated to the data requesting entity for provision of access to the further principal related data available at the at least one further data providing entity. The communicated at least one further encrypted access granting ticket is accompanied by at least one further identifier of the at least one further data providing entity. The creation of further access granting tickets is advantageous if not all the principal data for that access should be provided to the requesting entity is available at a single data processing entity. The data requesting entity can be provided with access granting tickets each encrypted with the encryption key of the corresponding data providing entity and each encrypted access granting ticket being accompanied with an identifier of the corresponding data providing entity; The respective principal identifier included in the respective access granting ticket may be specific for the respective data providing entity. Based on the multiple encrypted tickets and the accompanying corresponding identifiers, the data requesting entity can thus communicate multiple requests to the data providing entities for provision of access at multiple data providing entities. This embodiment supports the simultaneous provision of access to data related to a principal distributed over multiple data providing entities.

The present invention also concerns devices in order to implement the method as described above.

A principal entity for provision of access for a data requesting entity to data related to a principal, comprising a transmission unit for sending of messages and information and a processing unit for processing of messages and information, wherein the processing unit is adapted to create an access granting ticket comprising an access specification specifying a permission for an access to data related to the principal, said data being available at a data providing entity, and a principal identifier representing the principal towards the data providing entity, to encrypt the access granting ticket with an encryption key of the data providing entity, and to obtain an identifier of the data providing entity, and the transmission unit is adapted to send the encrypted access granting ticket accompanied by the identifier of the data providing entity to the data requesting entity.

According to a preferred embodiment of the principal entity, the processing unit is adapted to include verification information into the access granting ticket and/or to attach verification information to the encrypted access granting ticket and the transmission unit is adapted to send the encrypted access granting ticket accompanied by the attached verification information to the data requesting entity.

According to another preferred embodiment of the principal entity, the processing unit is adapted to access a data storage correlating at least two items of a group comprising the identifier of the data providing entity, the data related to the principal available at the data providing entity, the principal identifier, the encryption key, and the access specification, and to create the access granting ticket based on the data storage.

According to another preferred embodiment of the principal entity, the processing unit is adapted to create the access granting ticket based on an indication for the access specification entered into an input unit of the principal entity.

According to another preferred embodiment of the principal entity, the processing unit is adapted to include security information into the access granting ticket.

According to another preferred embodiment of the principal entity, the processing unit is adapted to obtain public information and the transmission unit is adapted to send the encrypted access granting ticket accompanied by the public information to the data requesting entity.

According to another preferred embodiment of the principal entity, the processing unit is adapted to create at least one further encrypted access granting ticket for further data related to the principal available at at least one further data providing entity and the transmission unit is adapted to send the further encrypted access granting ticket to the data requesting entity accompanied by at least one further identifier of the at least one further data providing entity for provision of access to the further principal related data accessible at the at least one further data providing entity.

A data requesting entity comprising a receiving unit for receiving messages and information, a transmission unit for sending of messages and information, and a processing unit for processing of messages and information, the receiving unit is adapted to receive a first encrypted access granting ticket for provision of access to first data related to a principal, said first data being available at a first data providing entity, the first encrypted access granting ticket being accompanied by an identifier of the first data providing entity and to receive a further encrypted access granting ticket for provision of access to further data related to the principal, said further data being available at a further data providing entity, the further encrypted access granting ticket being accompanied by a further identifier of the further data providing entity, the processing unit is adapted to generate a first request comprising the first encrypted access granting ticket and a further request comprising the further encrypted access granting ticket and the transmission unit is adapted to send the first request to the first data providing entity and the further request to the further data providing entity, and the receiving unit is adapted to receive a first indication for access provision to the first data from the first data providing entity and a further indication for access provision to the further data from the further data providing entity.

According to a preferred embodiment of the data requesting entity, at least one of the first encrypted access granting ticket and the further encrypted access granting ticket is accompanied by public information and the processing unit is adapted to analyze the public information before the generation of at least one of the first request and the further request.

According to another preferred embodiment of the data requesting entity, the first indication comprises the first data related to the principal and the further indication comprises the further data related to the principal.

A data providing entity for provision of access to data related to a principal, the data providing entity comprising a receiving unit for receiving messages and information, a transmission unit for sending of messages and information, and a processing unit for processing of messages and information, wherein the receiving unit is adapted to receive a request from a data requesting entity, the request comprising an access granting ticket encrypted with an encryption key of the data providing entity, the access granting ticket comprising an access specification specifying a permission for an access to data related to the principal, said data being available at the data providing entity, and a principal identifier representing the principal towards the data providing entity, the processing unit is adapted to decrypt the encrypted access granting ticket with a decryption key of the data providing entity corresponding to the encryption key and to provide to the data requesting entity access to data related to the principal identifier according to the access specification.

According to a preferred embodiment of the data providing entity, the encrypted access granting ticket comprises or is accompanied by verification information and the processing unit is adapted to provide access based on an analysis of the verification information.

According to another preferred embodiment of the data providing entity, the request comprises a specification for requested data related to the principal and the processing unit is adapted to provide access according to a matching of the access specification and the requested data.

According to another preferred embodiment of the data providing entity, the access granting ticket further comprises security information and the processing unit is adapted to provide access based on an analysis of the security information.

According to another preferred embodiment of the data providing entity, the encrypted access granting ticket is accompanied by public information and the processing unit is adapted to initiate the decryption based on an analysis of the public information.

According to another preferred embodiment of the data providing entity, the transmission unit is adapted to send the data, to which access is provided to, to the data requesting entity.

The present invention also concerns computer programs comprising portions of software codes in order to implement the method as described above when operated at the principal entity, the data requesting entity, or the data providing entity. The computer programs can be stored on a computer readable medium. The computer-readable medium can be a permanent or rewritable memory within the principal entity, the data requesting entity, or the data providing entity or located externally. The respective computer programs can be also transferred to the principal entity, the data requesting entity, or the data providing entity for example via a cable or a wireless link as a sequence of signals.

A computer program loadable into the processing unit of a principal entity, wherein the computer program comprises code adapted to create an access granting ticket comprising an access specification specifying a permission for an access to data related to the principal, said data being available at a data providing entity, and a principal identifier representing a principal towards the data providing entity, to encrypt the access granting ticket with an encryption key of the data providing entity, to obtain an identifier of a data providing entity, and to initiate a sending of the encrypted access granting ticket accompanied by the identifier of the data providing entity to the data requesting entity.

A computer program loadable into the processing unit of a data requesting entity, wherein the computer program comprises code adapted to process a first encrypted access granting ticket for provision of access to first data related to a principal, said first data being available at a first data providing entity, the first encrypted access granting ticket being accompanied by an identifier of the first data providing entity and to process a further encrypted access granting ticket for provision of access to further data related to the principal, said further data being available at a further data providing entity, the further encrypted access granting ticket being accompanied by a further identifier of the further data providing entity, to generate a first request comprising the first encrypted access granting ticket and a further request comprising the further encrypted access granting ticket and to initiate a sending of the first request to the first data providing entity and of the further request to the further data providing entity, and to process a first indication for access provision to the first data from the first data providing entity and a further indication for access provision to the further data from the further data providing entity.

A computer program loadable into the processing unit of a data providing entity, wherein the computer program comprises code adapted to process a request from a data requesting entity, the request comprising an access granting ticket encrypted with an encryption key of the data providing entity, the access granting ticket comprising an access specification specifying a permission for an access to data related to a principal, said data being available at the data providing entity, and a principal identifier representing the principal towards the data providing entity, to decrypt the encrypted access granting ticket with a decryption key of the data providing entity corresponding to the encryption key and to provide to the data requesting entity access to data related to the principal identifier according to the access specification.

DETAILED DESCRIPTION OF THE INVENTION

Figure 1:
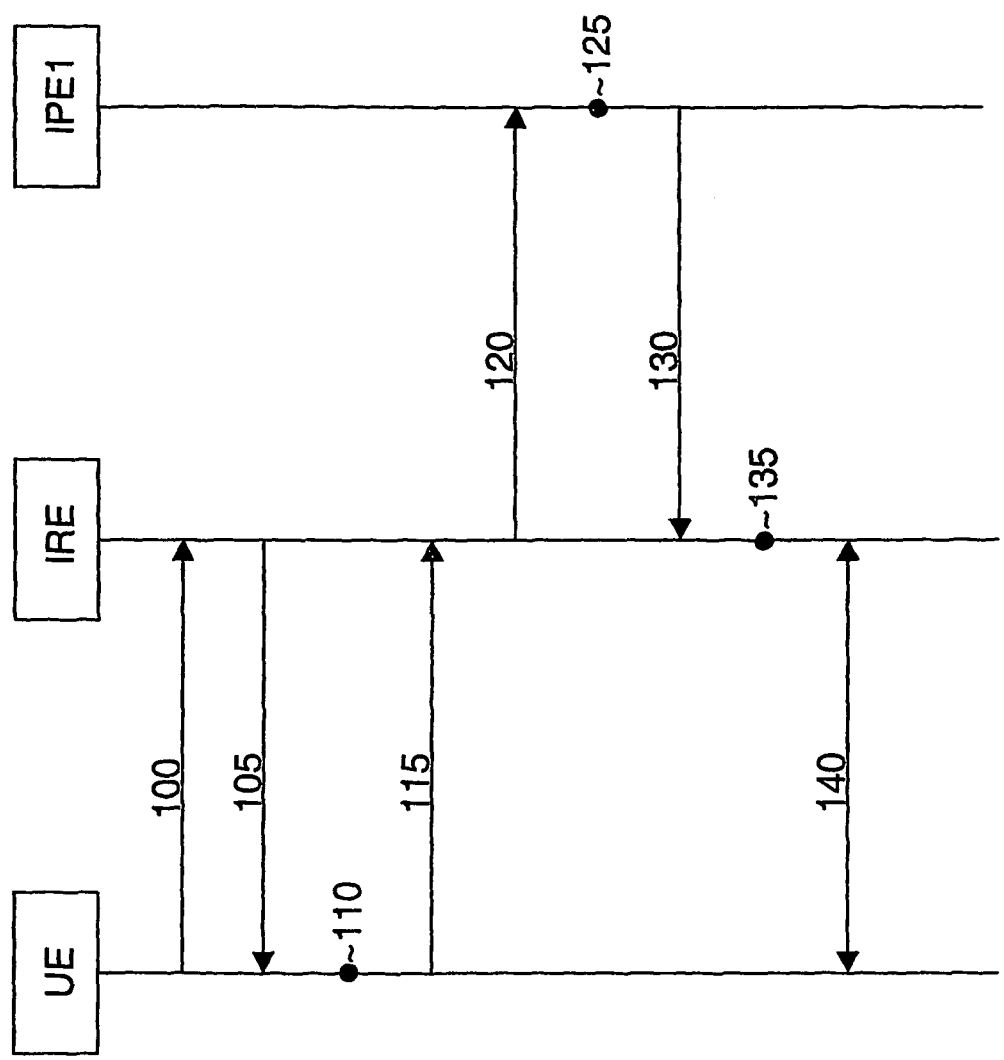
FIG. 1 illustrates a flow of messages and processes according to a first embodiment of the invention.

FIG. 1 illustrates a first embodiment of the present invention. The principal, e.g. represented by a user, sends from a principal entity UE like a mobile phone or a personal computer a request 100 for service to a service provider acting as data requesting entity IRE in this example. The data requesting entity IRE checks the request 100 and detects that in order to provide the requested service, data related to the principal is required, e.g. a credit card number for a financial service or a location of the principal for a location based service. The data requesting entity can generate a request 105 for the asking the principal for the required data and can send the request 105 to the principal entity UE.

The principal or the principal entity UE realize that the required data related to the principal is available at the data providing entity IPE1. The principal entity UE creates 110 an encrypted access granting ticket comprising an access specification comprising a permission to access the required data related to the principal. Furthermore the access granting ticket includes a principal identifier on base of which the data providing entity IPE1 can identify the data related to the principal. The access specification and the principal identifier are encrypted with an encryption key of the data providing entity IPE1. This encryption key is typically a public key according to Public-Key Infrastructure (PKI). Alternatively or in addition it can be also a secret key of the data providing entity IPE1. The principal entity obtains an identifier for the data providing entity IPE1 and sends the encrypted access granting ticket accompanied by the identifier of the data providing entity IPE1 via message 115 to the data requesting entity IRE. Based on the identifier of the data providing entity IPE1, the data requesting entity IRE knows where to send the encrypted access granting ticket. The data requesting entity IRE sends via request 120 the encrypted access granting ticket to the data providing entity IPE1, which subsequently decrypts 125 the encrypted access granting ticket with a decryption key corresponding to the encryption key with the decryption key being e.g. the private key of the data providing entity IPE1 corresponding to the public key of the data providing entity IPE1 used for encryption. The data providing entity IPE1 obtains the access specification and the principal identifier. Based on an analysis of the obtained information, the data providing entity IPE1 can e.g. search in a data storage for information that match to the principal identifier and to the data specified in the access specification. For provision of access to the data requesting entity IRE to the required data related to the principal, the data providing entity IPE1 can obtain the required data from the data storage and can send the required data related to the principal via message 130 to the data requesting entity IRE. The data requesting entity IRE, now in possession of the required data related to the principal, can process 135 the required data related to the principal accordingly and can grant 140 access to the requested service.

Many variants of the basic processes and messages 100-140 of FIG. 1 are possible. Some of them will be described in detail in the following.

Messages 100, 105 may be skipped for the case that the principal and/or the principal entity UE have a priori knowledge that the data requesting entity IRE requires certain data related to the principal. In this case, the request for service may be sent together with the encrypted access granting ticket accompanied by the identifier of the data providing entity IPE1 in message 115.

According to FIG. 1, the creation of the encrypted access granting ticket takes place at the principal entity UE. The principal entity UE preferably possesses or has access to a data storage; e.g. in the form of a list comprising names and identifiers of the entity data providing entities, the respective data related to the principal available at the respective data providing entity data providing entities, the respective encryption keys of the respective data providing entities, the respective principal identifiers at the respective data providing entities, and, optionally, predetermined, e.g. default, access specification lists. Name and identifier of a data providing entity can be identical.

Table A reveals an example for a data storage for two data providing entities with names IPE1,IPE2 and identifiers A_IPE1,A_IPE2, data D1 related to the principal available at the data providing entity IPE1 and data D2,D3 related to the principal available at the data providing entity IPE2, an encryption key K1 of the data providing entity IPE1 and encryption keys K2, K3 of the data providing entity IPE2 and access specifications AS1-AS4. The principal identifier I1 represents the principal at the data providing entity IPE1 and the identifiers I2,I3 represent the principal at the data providing entity IPE2.

| Provider Name | Provider Identifier | Data at Provider | Key of Provider | Principal Identifier | Access Specification |
|---|---|---|---|---|---|
| IPE1 | A_IPE1 | D1 | K1 | I1 | AS1 |
| IPE2 | A_IPE2 | D2 | K2 | I2 | AS2 |
| IPE2 | A_IPE2 | D3 | K2 | I3 | AS3 |
| IPE2 | A_IPE2 | D2 | K3 | I2 | AS4 |

Table A shows an example for a data storage according to the present invention

According to the data storage of table A, the following encrypted access granting tickets can be created:

According to the first row, an access granting ticket comprising the access specification AS1 for data related to the principal identifier I1 is created. Thus the access granting ticket comprises the access specification AS1 and the principal identifier I1. The access granting ticket is encrypted with the encryption key K1 and sent accompanied by the identifier A_IPE1 to a data requesting entity for requesting access provision at data providing entity IPE1.

According to the second row, a similar access granting ticket is created, now comprising the access specification AS2 and the principal identifier I2, encrypted with the key K2, and sent to a data requesting entity accompanied by the identifier A_IPE2 for access provision at the data providing entity IPE2.

The third rows differs from the second row to the extent that the principal now uses a principal identifier I3 being different from the principal identifier I2 in row 2. Using different identities represented by different principal identifiers can be advantageous for security, privacy, or practical reasons, e.g. to distinguish between different subsets of data D2 and D3 available at a single data providing entity IPE1.

The fourth row differs from the second row to the extent that a different encryption key K3 is used. Different keys may be used depending on subsets of the data available at a certain data providing entity. The encryption key may be stronger in the case that access to very sensitive data is to be provided. As an example, the data D2 available at the data providing entity IPE2 are identical according to the second and fourth row and also the same principal identifier I2 is used. However, the data D2 may contain less sensitive data related to the principal like a phone number or email-address and sensitive information like a credit card number. When access to less sensitive data is to be provided e.g. according to the access specification AS2, a weaker encryption key K2 may be used which saves processing and signaling effort at the involved entities. For provision of access to sensitive data e.g. according to the access specification AS4, a stronger encryption key may be used resulting in a stronger data protection.

Many other variants are possible which are not shown in Table A, e.g. the principal identifier I1 and I2 may be identical or a data providing entity may have more than one identifier.

An example for an access specification is given in Table B. This access specification comprises a list of data D1a-D1d available at a data providing entity IPE1 with associated read, modify, append, create, and delete permissions wherein an allowed access is indicated by "Y" and a prohibited access is indicated by "N". The access specification comprised in the encrypted access granting ticket may be in the form of table B for all data related to the principal at the data providing entity IPE1 or parts thereof, e.g. only data that is allowed to be accessed. As an example as string of data may be included in the access granting ticket comprising D1a R|M|A|C|D; D1c R as access specification according to the present example which reduces the data amount in the access granting ticket and thus the processing effort for encryption and decryption and the signaling effort due to the reduced data amount. Similarly, a negative access specification can be created by specifying the data for that provision of access is not allowed. The access specification may be predetermined or may be assembled based on inputs of the principal. In any case it can be advantageous for security reasons that a principal confirms the final access specification that is included in the access granting ticket. The confirmation step provides the principal with additional or explicit control over the data to which access is to be provided at the one or more data providing entities, here the data providing entity IPE1.

An example for D1a may be a field that may be used to enter free text by the data requesting entity IRE according to the access specification of table B. D1b may be a credit card number for which access is not permitted according to table B. D1c may be location information that can be read by the data providing entity according to the access specification of table B and D1d further data related to the principal for which no access is permitted.

TABLE B

Example for an access specification

| Data at IPE1 | Read (R) | Modify (M) | Append (A) | Create (C) | Delete (D) |
|---|---|---|---|---|---|
| D1a | Y | Y | Y | Y | Y |
| D1b | N | N | N | N | N |
| D1c | Y | N | N | N | N |
| D1d | N | N | N | N | N |

An access specification or an access granting ticket may be a piece of executable or self-executable software code instructing the data providing entity to provide access to the data related to the principal identifier and the access specification comprised in the encrypted access granting ticket. This has the advantage, that the software functionality at a data providing entity can be reduced.

Instead of creating the encrypted access granting ticket at the principal entity UE, some of the necessary processes may be delegated from the principal entity UE to one or more further entities (not shown in FIG. 1). For example, the encryption may take place at a further entity, which frees the principal entity UE from encryption functionality. The encrypted ticket may be then sent on behalf of the principal from the further entity to the data requesting entity IRE, which can reduce signaling and processing effort at the principal entity UE.

In the following, examples for tickets T1-T4 shown in FIG. 4 are described which can be created and processed according to the invention.

Figure 2:
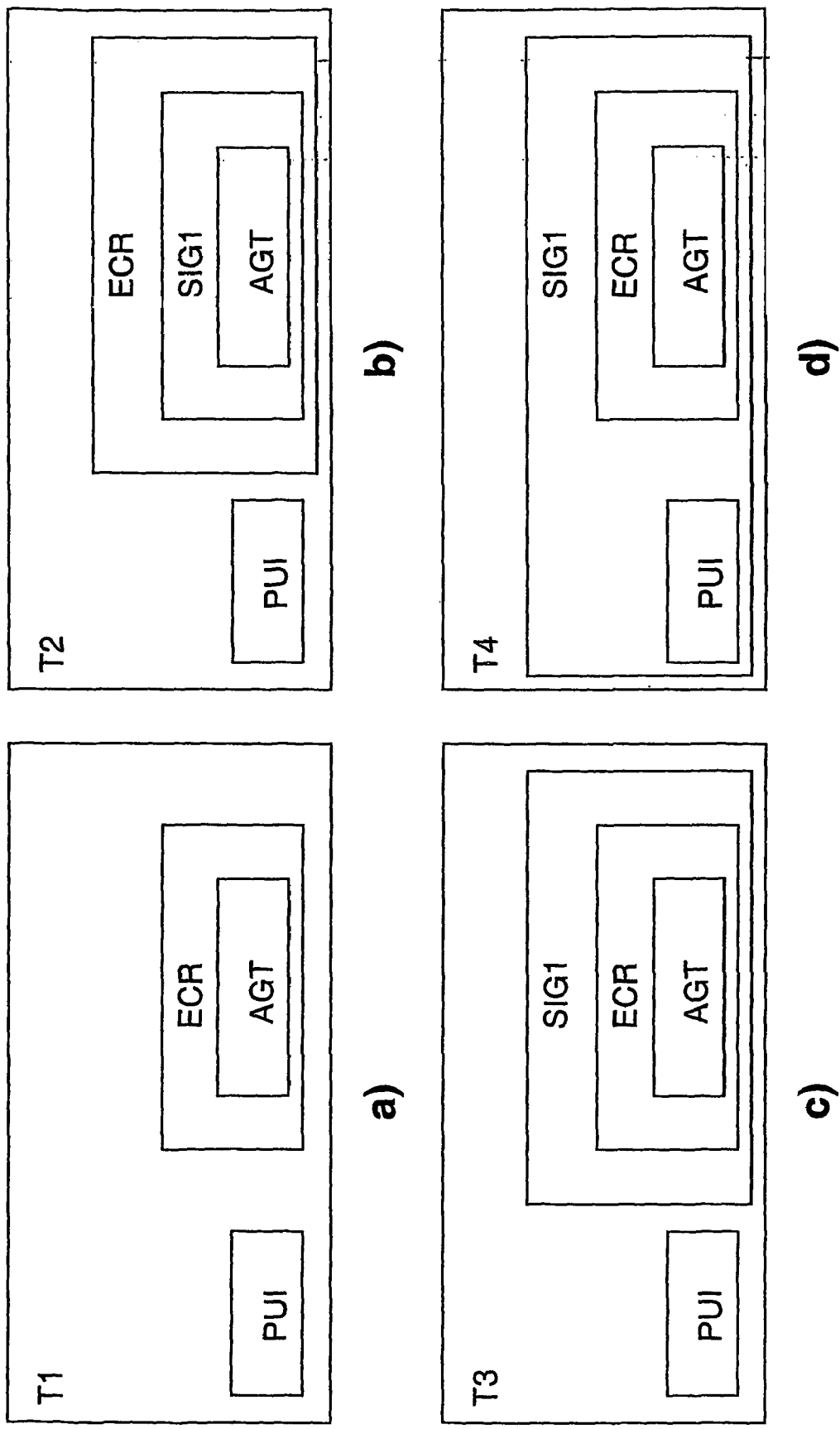
FIG. 2 illustrates examples for tickets according to the invention.

According to FIG. 2a, the first ticket T1 comprises an access granting ticket AGT encrypted with the encryption key ECR of the data providing entity at which access provision is to be performed. Mandatory parts in the access granting ticket AGT are an access specification and a principal identifier. For enhancing the security, security information like a time-to-live indicator, a sequence number or a nonce can be included in or attached to the access granting ticket AGT. Furthermore, verification information may be included in the encrypted access granting ticket AGT like an identifier for the data requesting entity or verification information for verification of the principal.

In addition, the first ticket T1 comprises a field reserved for public information being not encrypted by the encryption key ECR. The field may contain contents of the access granting ticket, of security information, or of verification information, or parts or combinations thereof that can be made publicly available. However, the principal identifier is most likely not disclosed in the public information due to security and/or privacy reasons. The identifier of the data providing entity accompanying the encrypted access granting ticket can be part of the public information. Thus, no extra identifier e.g. attached to the ticket has to be communicated.

The ticket or parts thereof can be signed by a digital signature SIG1 of the principal as illustrated in FIG. 2b)-d). The signature can be e.g. established by using a private key of the principal according to PKI or by using a secret key shared between the principal and the data providing entity. According to FIG. 2b) the AGT or parts thereof are signed which provides to the data providing entity information that the ticket T2 was originally created by the principal. In this sense, the signature can be regarded as verification information for the data providing entity, because from a comparison of the digital signature SIG1 to the principal identifier of the access granting ticket AGT the data providing entity can verify the principal. For verification of information that is signed with a private key, a corresponding public key has to be used. Simple PKI (SPKI) can be used instead or in addition for signing and signature verification.

According to the third ticket T3, the encrypted access granting ticket is signed with the digital signature SIG1, which can provide integrity verification for a data requesting entity and a data providing entity. According to FIG. 2d), the digital signature in the fourth ticket T4 covers the encrypted access granting ticket ECR, AGT and the public information which can ensure also integrity to the involved parties for the signed information.

In the following, several embodiments of the invention are described for different types of tickets and access specifications. Reference is made to FIG. 1 for explanation and better understanding and the term ticket is now used instead of encrypted access granting ticket accompanied by an identifier of the access providing entity.

When receiving a ticket, the data requesting entity IRE can analyze public information and make its decision for a request for data access dependent on a result of the analysis. For example, if the public information contains a time-to-live indicator, the data requesting entity IRE may discard the ticket if the time-to-live indicator is expired and no request is sent to the data providing entity IPE1.

Another example may be an invalid sequence number, e.g. a number used for a previous data access, or not matching combinations of contents of the public information, e.g. a time-to-live indicator not matching to an accessing time of the data providing entity IPE1, e.g. it may be known by the data requesting entity IRE that the data providing entity IPE1 is not accessible during a certain time period and the allowed time according to the time-to-live indicator falls into that certain time period. Thus, if the analysis of the public information reveals an invalid ticket, the request to the data providing entity IPE1 may be skipped.

For the sending of the request 120 to the data requesting entity IRE, the data requesting entity can look up the identifier of the data providing entity IPE1 comprised e.g. in the public information as explained earlier. The looked-up identifier may be converted into an address of the data providing entity to which the request 120 is sent.

In the request 120, the data requesting entity IRE may ask for provision for access to certain requested data related to the principal. This requested data may be identical to the data specified by the access specification or different. Requested data can be different if the data requesting entity IRE requests principal related data from the principal entity UE, e.g. by message 105, and the principal entity UE responds in message 115 with an access specification with a permission for an access to data related to the principal being different from the originally requested data, e.g. because the principal may not want to permit the data requesting entity IRE access to all of the requested data. Other reasons for an occurrence of different data are possible, e.g. if a ticket without any public information about the access specification is directed to a non-entitled data requesting entity IRE or just because the data requesting entity IRE is not provided with sufficient information about the access specification, e.g. in case if the principal uses a priori knowledge about requested data by the data providing entity IPE1 which is wrong in the sense that the access specification according to the a priori knowledge does not match to the data related to the principal as requested by the data requesting entity IRE.

The data providing entity IPE1 receiving the ticket has several options to proceed, e.g. depending on the ticket or possible requested data.

If the ticket comprises public information it can be advantageous to first analyze the public information in order to make a first check for the validity of the ticket (e.g. based on the time-to-live indicator or the sequence number), a first verification of the data requesting entity IRE (e.g. by comparing an identifier like a name or identifier of the data requesting entity IRE as given in the public information with an identifier or name obtainable from communication with the data requesting entity IRE) or combinations thereof. It may check alternatively or in addition if one or more further information is given in the public information like the ticket being not valid in a specific country or region. If the ticket is signed, the signature can be checked for a first verification of the principal and for first proving integrity. If any of the checks fails, the data providing entity IPE1 may terminate the provision of access.

Else, the data providing entity IPE1 may proceed in decrypting the encrypted part of the ticket with its decryption key. It obtains the access specification and the principal identifier and, if security or verification information or both are comprised in the encrypted part of the access granting ticket, at least one of the security and verification information. Checking the security information and/or verification information from the encrypted part can be achieved in a similar way compared to the checking of the security or verification information comprised in public information, however, checking the security or verification information obtained from the encrypted part of the ticket is much more secure, because the encryption provides that the encrypted contents are protected from being tampered by any third party not in possession with the corresponding decryption key, e.g. like the data requesting entity IRE. The decryption key is secret and is typically owned by the data providing entity IPE1, however, the decryption can be executed on behalf of the data providing entity IPE1 at a further entity provided with the decryption key. Depending on the outcome of the analysis of the security or verification information, the data providing entity IPE1 may proceed with the provision of access or may terminate the procedure.

Based on the access specification and the principal identifier, the data providing entity IPE1 can provide access, e.g. it can search in a data storage for the data related to the principal identifier and can provide e.g. read access according to the access specification for the data-related to the principal identifier. The data providing entity IPE1 may match the data as specified in the access specification with requested data as requested by the data requesting entity IRE, e.g. it may terminate the provision for access if both data do not match or match only partly. According to another implementation, the data providing entity IPE1 may provide access to parts of both data that match. For security reasons, the data providing entity may compare the access specification with own access restrictions, e.g. it may allow the reading of data related to a principal but not the writing, modifying, appending, creating, and/or deleting and provide access to data related to the principal identifier according to a matching of the access specification and its own access restrictions. Thus, the data providing entity can ensure that data related to the principal cannot be changed which may be important for technical or legal reasons the principal is not aware of.

The provision of access to the data related to the principal identifier can occur for example as follows. In case of a read access to data related to the principal identifier, the data providing entity IPE1 may obtain said data from a data storage or request it from an entity where said data is stored or generated and send said data to the data requesting entity IRE. In case of a delete permission, the data providing entity IPE1 may perform the deleting with or without further communication with the data requesting entity IRE. In case of other permissions like write, modify, append, or create, a bi-directional communication may be established between them for provision of access to data related to the principal according to the access specification. Alternatively, the request to the data providing entity can explicitly contains the data that are to be written, modified, or created and the writing, modifying, and appending can be executed according to the access specification for the data related to the principal identifier and the contained data. A confirmation for the execution of the request can be sent to the requesting entity. The method may be implemented such that in case of no further communication or in case that no confirmation of the access provision is received, the respective absence of the further communication or confirmation may be interpreted by the data requesting entity as an implicit indication for provision of access.

Figure 3:
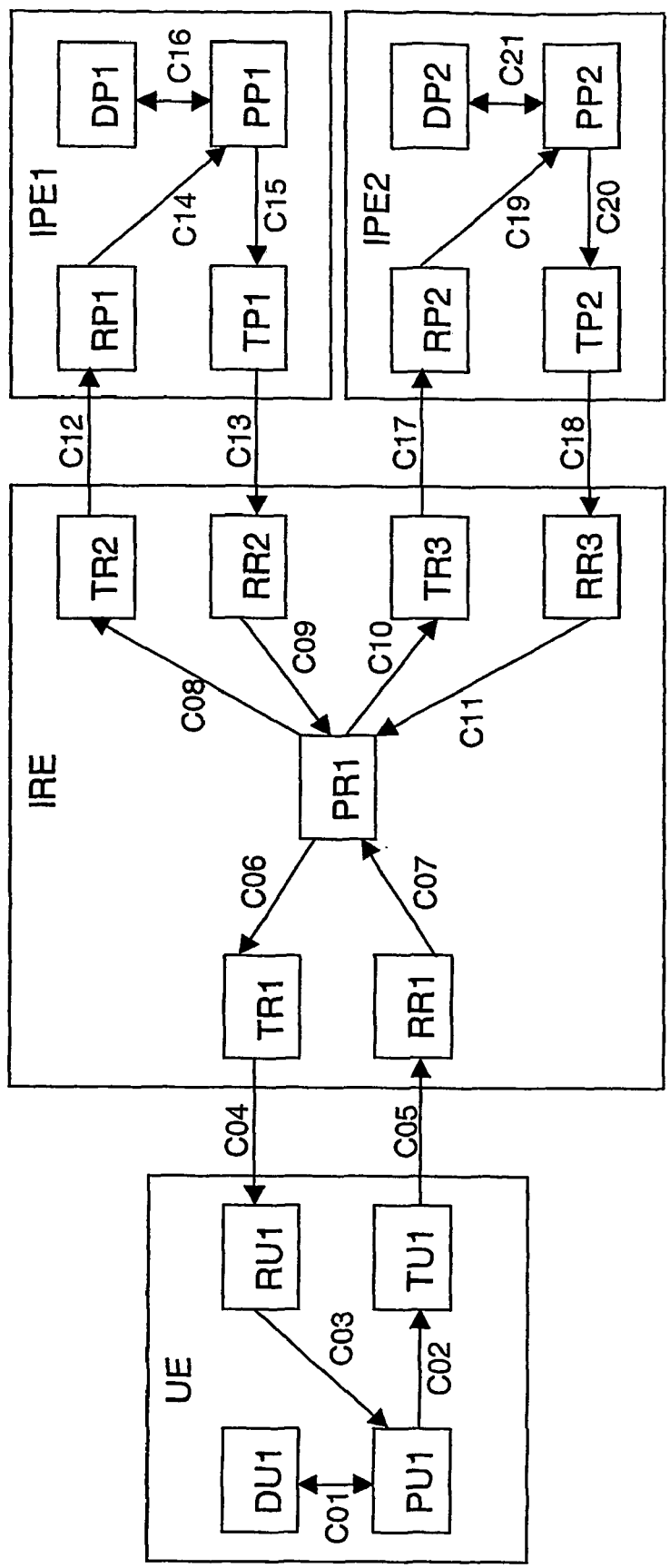
FIG. 3 illustrates devices and connections according to a second embodiment of the invention.

FIG. 3 shows an example for devices with relevant units and connections for implementing the invention according to a second embodiment wherein data related to the principal for that access is to be provided to the data requesting entity IRE is distributed over two data providing entities IPE1,IPE2. According to the present example, the principal entity UE consists of a receiving unit RU1, a transmission unit TU1, a processing unit PU1, and a data storage DU1. The data storage DU1 can be organized similar to e.g. the first two rows of the data storage shown in table B. The principal entity UE can comprise an input/output unit for entering/presenting data to the principal. This input/output unit is not shown as the input and output functionality is covered by the receiving unit RU1 and the transmission unit TU1, respectively. The principal entity UE can generate a request for service in the processing unit PU1 and send this request for service via connection C02 to the transmission unit TU1 which further sends the request via connection C05 to the receiving unit RR1 of the data requesting entity IRE. The receiving unit RR1 sends the request via connection C07 to its processing unit PR1. A request for data related to the principal for granting access to the requested service can be generated in the processing unit PR1, which then can send this request via the transmission unit TR1 to the receiving unit RU1 and the processing unit PU1 via connections C06,C04,C03.

The processing unit PU1 checks its data storage DU1 and detects that the data related to the principal as requested by the data requesting entity IRE is distributed over the first data providing entity IPE1 and the second data providing entity IPE2 and creates based on its data storage DU1, a first ticket comprising an first encrypted access granting ticket for the first data providing entity IPE1 accompanied by a first identifier of the first data providing entity IPE1 and a second ticket comprising a second encrypted access granting ticket for the second data providing entity IPE2 accompanied by a second identifier of the second data providing entity IPE2.

The first access granting ticket comprises a first access specification for first data related to the principal available at the first data providing entity IPE1 and a first principal identifier representing the principal at the first data providing entity IPE1. The first access granting ticket is encrypted with a first encryption key of the first data providing entity IPE1. Similarly, the second access granting ticket comprises a second access specification for second data related to the principal available at the second data providing entity IPE2 and a second principal identifier representing the principal at the second data providing entity IPE2 and the second access granting ticket is encrypted with a second encryption key of the second data providing entity IPE2.

According to the present example, the first ticket and the second ticket are sent from the processing unit PU1 via the transmission unit TU1 and the receiving unit RR1 to the processing unit PR1 via connections C02,C05,C07. The processing unit PR1 generates a first request comprising the first ticket and a second request comprising the second ticket. Alternatively, the processing unit can generate at least one of the two requests comprising both tickets. In practice, it can be advantageous to include the two tickets as received into both requests, which can reduce processing effort at the data requesting entity IRE. The data providing entities IPE1,IPE2 can be adapted to discard the invalid tickets, i.e. the second ticket being invalid for the first data providing entity IPE1 and the first ticket being invalid for the second data providing entity IPE2.

From the processing unit PR1 the first request can be sent via the transmission unit TR2 and via the receiving unit RP1 to the processing unit PP1 of the first data providing entity IPE1 using connections C08,C12,C14. Similarly, the second ticket can be sent via the transmission unit TR3 and via the receiving unit RP2 to the processing unit-PP2 via connections C10,C17,C19.

For provision of access, the processing unit PP1 processes the first ticket according to the invention and provides access to the data related to the principal identifier in the data storage DP1 according to the first access specification. For read permission the processing unit PP1 can obtain the first data from the data storage DP1 via connection C16 and send a message comprising the obtained data via the transmission unit TP1 and via the receiving unit RR2 to the processing unit PR1' via connections C15,C13,C09. Similarly, the provision of access can be achieved for the second ticket by the processing unit PP2 and the data storage DP2 and the transmission unit TP2 and the receiving unit RR3 and the connections C21,C20, C18,C11 resulting in a sending of the second data from the second data providing entity IPE2 to the data requesting entity IRE.

Based on the provided first and second data related to the principal, the data requesting entity IRE can perform the service requested by the principal entity. UE, e.g. by utilizing the transmission unit TR1 and the receiving unit RU1 and connections C06,C04,C03 for communication from the processing unit PR1 to the processing unit PU1 and by utilizing the transmission unit TU1 and the receiving unit RR1 and connections C02,C05,C07 for communication from the processing unit PU1 to the processing unit PR1.

The example for the devices and connections for implementing the method is only one out of many possible examples. For example, more than two data providing entities may be addressed for provision of access by creating and communicating more than two encrypted access granting tickets is possible. Instead of using three transmission units TR1,TR2,TR3 only one or two transmission units may be used. The same applies to the receiving units RR1,RR2,RR3. The transmission units TR1,TR2,TR3 and the receiving units RR1,RR2,RR3 may be integrated in one or more transceiver units. Similarly, the receiving unit RU1 and the transmission unit TU1 may be integrated in a transceiver unit which applies also for the respective units for the first data providing entity IPE1 and the second data providing entity IPE2. Furthermore, the data requesting entity IRE may comprise a data storage for storing accessed data or tickets or parts thereof. Two or more of the involved entities although depicted as separated devices in FIG. 3 may be realized on a common platform, e.g. on a common server. Further examples for the involved entities are the principal entity being a mobile phone or a personal computer and the data requesting entity IRE being a server of a service provider in the Internet and the data providing entities IPE1, IPE2 being further servers of further server providers or nodes in a communication network. Further entities like routers can be interposed between a principal entity, a data requesting entity IRE and/or data providing entities. Connections can be wired or wireless or combinations thereof. A connection used for sending a message from a first entity to a second entity in one direction may be identical or different from a connection used for sending a message from the second entity to the first entity. A user entity may send tickets to multiple data requesting entities.

Data related to a principal is indeed collected, stored and processed by a multitude of different entities. The present invention addresses these distributed aspects and provides a solution for providing access to data related to a principal distributed over many entities. Furthermore, the principal can stay in control and can decide on the base of access granting tickets which data can be accessed by whom and to what extent. Furthermore, the method according to the invention is secure in an open network environment because of the encryption. The method provides confidentiality, privacy, and security, which increase the acceptance of the method. In addition, the principal control fits to legal requirements. Furthermore, a large number of data providing entities can be used for provision of access to data related to the principal to a data requesting entity due to the fact that the principal does not need to have access to a data providing entity.

The invention claimed is:

1. A method for provision of access for a data requesting entity to data related to a principal, comprising the following steps:
    creating, by a processor, an access granting ticket comprising:
        (a) an access specification specifying a permission for an access to data related to the principal, said data being available at a data providing entity,
        (b) a principal identifier representing the principal towards the data providing entity,
    encrypting the access granting ticket, wherein the ticket comprises the access specification and the principal identifier, with an encryption key of the data providing entity,
    communicating to the data requesting entity the encrypted access granting ticket accompanied by an identifier of the data providing entity,
    communicating from the data requesting entity to the data providing entity a request comprising the encrypted access granting ticket based on said communicated data providing entity identifier,
    decrypting the encrypted access granting ticket with a decryption key of the data providing entity corresponding to the encryption key,
    providing to the data requesting entity access to data related to the principal identifier according to the access specification.

2. The method according to claim 1, wherein the encrypted access granting ticket comprises or is accompanied by verification information and access is provided based on an analysis of the verification information.

3. The method according to claim 1, wherein the request to the data providing entity comprises a specification for requested data related to the principal and access is provided according to a matching of the access specification and the requested data.

4. The method according to claim 1, wherein the access granting ticket is created based on a data storage correlating at least two items of a group comprising the identifier of the data providing entity, the data related to the principal available at the data providing entity, the principal identifier, the encryption key, and the access specification.

5. The method according to claim 1, wherein an indication for the access specification is entered into a principal entity to create the access granting ticket.

6. The method according to claim 1, wherein the access granting ticket further comprises security information and access is provided based on an analysis of the security information.

7. The method according to claim 1, wherein the encrypted access granting ticket is accompanied by public information.

8. The method according to claim 1, wherein the request to the data providing entity is communicated based on an analysis of the public information.

9. The method according to claim 1, wherein the decryption is based on an analysis of the public information.

10. The method according to claim 1, wherein the data to which access is provided to is transferred to the data requesting entity.

11. The method according to claim 1, wherein at least one further encrypted-access granting ticket for further data related to the principal available at least one further data providing entity is created and communicated to the data requesting entity for provision of access to the further principal related data available at the at least one further data providing entity, the at least one further encrypted access granting ticket being accompanied by at least one further identifier of the at least one further data providing entity.

12. A principal entity for provision of access for a data requesting entity to data related to a principal, comprising:
    a transmission unit for sending of messages and information and
    a processing unit, using a processor, for processing of messages and information, wherein the processing unit is configured to create an access granting ticket comprising:

(a) an access specification specifying a permission for an access to data related to the principal, said data being available at a data providing entity, and (b) a principal identifier representing the principal towards the data providing entity, the processing unit further configured to encrypt the access granting ticket, wherein the ticket comprises the access specification and the principal identifier, with an encryption key of the data providing entity in response to receiving, from the data providing entity, an encrypted access granting ticket accompanied by an identifier of the data providing entity, and the processing unit further configured to obtain the identifier of the data providing entity, and the transmission unit further configured to send the encrypted access granting ticket accompanied by the identifier of the data providing entity to the data requesting entity.

13. The principal entity according to claim 12, wherein the processing unit is adapted to include verification information into the access granting ticket and/or to attach verification information to the encrypted access granting ticket and the transmission unit is adapted to send the encrypted access granting ticket accompanied by the attached verification information to the data requesting entity.

14. The principal entity according to claim 12, wherein the processing unit is adapted to access a data storage correlating at least two items of a group comprising of the identifier of the data providing entity, the data related to the principal available at the data providing entity, the principal identifier, the encryption key, and the access specification, and to create the access granting ticket based on the data storage.

15. The principal entity according to claim 12, wherein the processing unit is adapted to create the access granting ticket based on an indication for the access specification entered into an input unit of the principal entity.

16. The principal entity according to claim 12, wherein the processing unit is adapted to include security information into the access granting ticket.

17. The principal entity according to claim 12, wherein the processing unit is adapted to obtain public information and the transmission unit is adapted to send the encrypted access granting ticket accompanied by the public information to the data requesting entity.

18. The principal entity according to claim 12, wherein the processing unit is adapted to create at least one further encrypted access granting ticket for further data related to the principal available at least one further data providing entity and the transmission unit is adapted to send the further encrypted access granting ticket to the data requesting entity accompanied by at least one further identifier of the at least one further data providing entity for provision of access to the further principal related data accessible at the at least one further data providing entity.

19. A data requesting entity comprising;
a receiving unit for receiving messages and information;
a transmission unit for sending of messages and information, and
a processing unit, using a processor, for processing of messages and information,
wherein the receiving unit is configured to receive a first encrypted access granting ticket for provision of access to first data related to a principal, said first data being available at a first data providing entity, the first encrypted access granting ticket being accompanied by an identifier of the first data providing entity and wherein the receiving unit is further configured to receive a further encrypted access granting ticket for provision of access to further data related to the principal, said further data being available at a further data providing entity, the further encrypted access granting ticket being accompanied by a further identifier of the further data providing entity, wherein the processing unit is configured to generate a first request comprising the first encrypted access granting ticket and a further request comprising the further encrypted access granting ticket and wherein the transmission unit is configured to send the first request to the first data providing entity and the further request to the further data providing entity, based on the corresponding data providing entity identifier received from the first or the further encrypted access granting ticket, respectively, and wherein the receiving unit is configured to receive a first indication for access provision to the first data from the first data providing entity, in response to the first request, and a further indication for access provision to the further data, in response to the further request, from the further data providing entity.

20. The data requesting entity according to claim 19, wherein at least one of the first encrypted access granting ticket and the further encrypted access granting ticket is accompanied by public information and the processing unit is adapted to analyze the public information before the generation of at least one of the first request and the further request.

21. The data request according to claim 19, wherein the first indication-comprises the first data related to the-principal-and the further indication comprises the further data related to the principal.

22. A data providing entity for provision of access to data related to a principal, the data providing entity comprising:
a receiving unit for receiving messages and information,
a transmission unit for sending of messages and information and communicating to a data requesting entity an encrypted access granting ticket accompanied by an identifier of the data providing entity, and
a processing unit for processing of messages and information,
wherein the receiving unit is configured to receive a request from a data requesting entity transmitted based on said accompanied data providing entity identifier in response to said communicated encrypted access granting ticket, the request comprising an access granting ticket encrypted with an encryption key of the data providing entity, the access granting ticket comprising an access specification specifying a permission for an access to data related to the principal, said data being available at the data providing entity, and a principal identifier representing the principal towards the data providing entity;
wherein the processing unit is configured to decrypt the encrypted access granting ticket, which was received from the data requesting entity, with a decryption key of the data providing entity corresponding to the encryption key and
wherein the processing unit is further configured to provide to the data requesting entity access to data related to the principal identifier according to the access specification.

23. The data providing entity according to claim 22, wherein the encrypted access granting ticket comprises or is accompanied by verification information and the processing unit provides access based on an analysis of the verification information.

24. The data providing entity according to claim 22, wherein the request comprises a specification for requested data related to the principal and the processing unit provides access according to a matching of the access specification and the requested data.

25. The data providing entity according to claim 22, wherein the access granting ticket further comprises security information and the processing unit provides access based on an analysis of the security information.

26. The data providing entity according to claim 22, wherein the encrypted access granting ticket is accompanied by public information and the processing unit initiates the decryption based on an analysis of the public information.

27. The data providing entity according to claim 22, wherein the transmission unit sends the data, to which access is provided to, to the data requesting entity.

28. A non-transitory computer readable storage medium having stored thereon a plurality of instructions, the plurality of instructions including instructions which, when executed by a processor, cause the processor to perform the steps of a method, comprising:
   create an access granting ticket comprising an access specification specifying a permission for an access to data related to the principal, said data being available at a data providing entity, and a principal identifier representing a principal towards the data providing entity,
   encrypting the access granting ticket, wherein the ticket comprises the access specification and the principal identifier, with an encryption key of the data providing entity,
   communicating to the data requesting entity the encrypted access granting ticket accompanied by an identifier of the data providing entity,
   communicating from the data requesting entity to the data providing entity a request comprising the encrypted access granting ticket based on said communicated data providing entity identifier,
   decrypting the encrypted access granting ticket with a decryption key of the data providing entity corresponding to the encryption key,
   providing to the data requesting entity access to data related to the principal identifier according to the access specification.

29. A non-transitory computer readable storage medium having stored thereon a plurality of instructions, the plurality of instructions including instructions which, when executed by a processor, cause the processor to perform the steps of a method, comprising:
   processing a first encrypted access granting ticket, received from a first data providing entity, for provision of access to first data related to a principal, said first data being available at the first data providing entity, the first encrypted access granting ticket being accompanied by an identifier of the first data providing entity and
   processing a further encrypted access granting ticket, received from a further data providing entity, for provision of access to further data related to the principal, said further data being available at the further data providing entity, the further encrypted access granting ticket being accompanied by a further identifier of the further data providing entity,
   generating a first request comprising the first encrypted access granting ticket and a further request comprising the further encrypted access granting ticket wherein the access ticket is encrypted with an encryption key of the data providing entity, the access granting ticket comprising an access specification specifying a permission for an access to data related to the principal and
   initiating a sending of the first request to the first data providing entity and of the further request to the further data providing entity, based on the corresponding data providing entity identifier received from the first or the further encrypted access granting ticket, respectively, and
   processing a first indication for access provision to the first data from the first data providing entity, in response to the first request, and a further indication for access provision to the further data, in response to the further request, from the further data providing entity.

30. A non-transitory computer readable storage medium having stored thereon a plurality of instructions, the plurality of instructions including instructions which, when executed by a processor, cause the processor to perform the steps of a method, comprising:
   communicating to a data requesting entity an encrypted access granting ticket accompanied by an identifier of the data providing entity;
   processing a request from a data requesting entity transmitted based on said accompanied data providing entity identifier in response to said communicated encrypted access granting ticket, the request comprising an access granting ticket encrypted with an encryption key of the data providing entity, the access granting ticket comprising an access specification specifying a permission for an access to data related to a principal, said data being available at the data providing entity, and a principal identifier representing the principal towards the data providing entity,
   decrypting the encrypted access granting ticket, which was received from the data requesting entity, with a decryption key of the data providing entity corresponding to the encryption key and
   providing to the data requesting entity access to data related to the principal identifier according to the access specification.

* * * * *

UNITED STATES PATENT AND TRADEMARK OFFICE
CERTIFICATE OF CORRECTION

PATENT NO. : 7,958,548 B2
APPLICATION NO. : 10/551855
DATED : June 7, 2011
INVENTOR(S) : Busboom et al.

Page 1 of 2

It is certified that error appears in the above-identified patent and that said Letters Patent is hereby corrected as shown below:

On the Title Page, in Item (75), under "Inventors", in Column 1, Line 3, delete "Raphael" and insert -- Raphaël -- therefor.

On the Title Page, in Item (75), under "Inventors", in Column 1, Line 4, delete "Klaukkala" and insert -- Vantaa --, therefor.

In the Specifications:

In Column 1, Line 27, delete "like a" and insert -- like an --, therefor.

In Column 2, Line 16, delete "verifies," and insert -- verifies --, therefor.

In Column 9, Line 48, delete "invention." and insert -- invention; and --, therefor.

In Column 9, Line 50, delete "invention;" and insert -- invention. --, therefor.

In Column 10, Line 52, delete "storage;" and insert -- storage, --, therefor.

In Column 15, Line 5, delete "data-related" and insert -- data related --, therefor.

In Column 16, Line 48, delete "unit-PP2" and insert -- unit PP2 --, therefor.

In Column 16, Line 57, delete "PP1'" and insert -- PP1 --, therefor.

In the Claims:

In Column 19, Line 56, in Claim 19, delete "comprising;" and insert -- comprising: --, therefor.

In Column 20, Line 31, in Claim 21, delete "request" and insert -- requesting entity --, therefor.

Signed and Sealed this
Twenty-eighth Day of May, 2013

Teresa Stanek Rea
*Acting Director of the United States Patent and Trademark Office*

CERTIFICATE OF CORRECTION (continued)
U.S. Pat. No. 7,958,548 B2

In Column 20, Line 32, in Claim 21, delete "indication-comprises" and insert -- indication comprises --, therefor.

In Column 20, Lines 32-33, in Claim 21, delete "the-principal-and" and insert -- the principal and --, therefor.